(12) United States Patent
Schimmelpfeng et al.

(10) Patent No.: US 10,397,201 B2
(45) Date of Patent: Aug. 27, 2019

(54) SENDING ENCRYPTED DATA TO A SERVICE PROVIDER

(71) Applicant: HEWLETT-PACKARD DEVELOPMENT COMPANY, L.P., Houston, TX (US)

(72) Inventors: Joern Schimmelpfeng, Boeblingen (DE); Timo Schneller, Boeblingen (DE); Michael Bernd Beiter, Fort Collins, CO (US); Carsten Laengerer, Boeblingen (DE)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 387 days.

(21) Appl. No.: 14/775,937

(22) PCT Filed: Mar. 15, 2013

(86) PCT No.: PCT/US2013/032247
§ 371 (c)(1),
(2) Date: Sep. 14, 2015

(87) PCT Pub. No.: WO2014/142996
PCT Pub. Date: Sep. 18, 2014

(65) Prior Publication Data
US 2016/0021079 A1    Jan. 21, 2016

(51) Int. Cl.
*H04L 29/00* (2006.01)
*H04L 29/06* (2006.01)

(52) U.S. Cl.
CPC ........ *H04L 63/061* (2013.01); *H04L 63/0421* (2013.01); *H04L 63/0281* (2013.01); *H04L 2209/42* (2013.01)

(58) Field of Classification Search
CPC .................................. G06F 13/00; H04L 9/32
USPC ........................................................ 713/171
See application file for complete search history.

(56) References Cited

U.S. PATENT DOCUMENTS

| | | | |
|---|---|---|---|
| 6,779,111 B1 * | 8/2004 | Gehrmann | H04L 9/302 380/259 |
| 2001/0036224 A1 | 11/2001 | Demello et al. | |
| 2002/0080968 A1 | 6/2002 | Olsson | |
| 2004/0078593 A1 | 4/2004 | Hind | |
| 2006/0020783 A1 | 1/2006 | Fisher | |
| 2006/0085454 A1 | 4/2006 | Blegen et al. | |
| 2006/0155985 A1 | 7/2006 | Canard et al. | |
| 2008/0235508 A1 | 9/2008 | Ran | |
| 2010/0229241 A1 | 9/2010 | Liu et al. | |
| 2012/0204032 A1 * | 8/2012 | Wilkins | H04L 9/006 713/170 |

(Continued)

OTHER PUBLICATIONS

International Search Report and Written Opinion, dated Dec. 13, 2013, PCT Patent Application No. PCT/US2013/032247, 11 pages.

(Continued)

*Primary Examiner* — Brandon S Hoffman
*Assistant Examiner* — Michael D Anderson (57) ABSTRACT

Sending encrypted data to a service provider includes exchanging an encryption key between an entity and a service provider without retaining the encryption key and while hiding an identity of said entity from the service provider and forwarding encrypted data based on the encryption key to the service provider from the entity while hiding the identity of the entity from the service provider.

20 Claims, 3 Drawing Sheets

(56) References Cited

U.S. PATENT DOCUMENTS

2014/0105382 A1    4/2014  Liu

OTHER PUBLICATIONS

Extended European Search Report dated Oct. 11, 2016; EP Application No. 13877870.9; pp. 5.

* cited by examiner

SENDING ENCRYPTED DATA TO A SERVICE PROVIDER

CROSS-REFERENCE TO RELATED APPLICATION

This application is a U.S. National Stage Application of and claims priority to International Patent Application No. PCT/US2013/032247, filed on Mar. 15, 2013, and entitled "SENDING ENCRYPTED DATA TO A SERVICE PROVIDER".

BACKGROUND

Online service providers offer services over the internet to customers that do not wish to invest capital in information technology (IT) equipment of their own. Such service providers reduce costs by using leverage effects at the service provider side and also make the customers' IT more flexible to their unique business circumstances. Service providers relieve the customer from keeping local data stores, having backup and maintenance issues, and having extensive IT staffing costs. Service providers can be combined with a data center based infrastructure that collects and analyzes data and creates reports for the customer's IT department.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Service providers can perform many services over the internet. For example, some service providers determine the health of the entity's IT environment by monitoring and analyzing the availability and performance of applications, nodes, and services across the enterprise IT infrastructure. To achieve this, such service providers use detailed information on the IT environment called the topology. The topology is a graph consisting of configuration items, which represent services, hardware, program elements, and the relationships between these items. These relationships describe how two configurable items interact with each other. A service provider may use sensors to collect performance metrics for each configuration item. The combination of performance metrics and the topology enables a service provider to provide a holistic view of the IT status and health. In case of failures or special conditions, configurable rule sets allow the service provider to alert the entity (e.g. by email) so that the entity can take corrective action. Usually, entities can set a threshold for a metric to trigger alerts.

Much of the information used by such a service provider is sensitive because such knowledge about an entity's topology reveals a lot about the entity's business, and permits abuse for market analysis, company performance comparison, or even cyber-attacks on the entity's IT infrastructure. For these reasons, entities are traditionally very protective of this type of information, which is supplied to the service providers. When executing a service performed by a service provider, the business IT infrastructure information is uploaded to a data center environment where business executives are concerned about their data's security and privacy.

The principles described herein include a method for sending encrypted data to a service provider in such a manner that the entity's sensitive information is protected while giving the service provider access to the information it can use to provide its services. Such a method includes exchanging an encryption key between an entity and a service provider without retaining the encryption key and while hiding an identity of the entity from the service provider and forwarding encrypted data based on the encryption key to the service provider from the entity while hiding the identity of the entity from the service provider.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
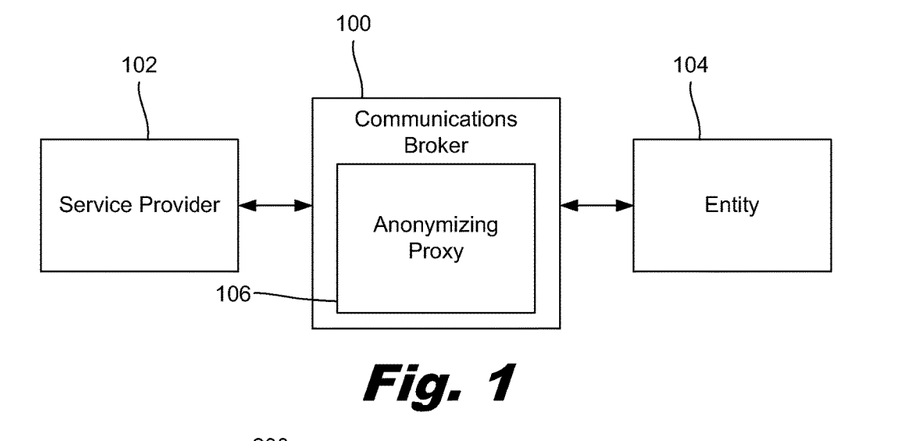
FIG. 1 is a diagram of an example of a communication broker according to the principles described herein.

FIG. 1 is a diagram of an example of a communication broker (100) according to the principles described herein. In this example, the communications broker (100) is in communication with the service provider (102) and the entity (104). The communications broker (100) has an anonymizing proxy (106), which is a tool that causes internet communications to be untraceable. Thus, neither the service provider (102) nor the entity (104) can trace its communications with the communications broker (100) to determine with whom else the communications broker (100) has been communicating.

The entity (104) may be an organization with an IT environment, such as a corporation, a government, a non-profit, a business entity, another type of organization, or combinations thereof. In other examples, the entity (104) is an individual seeking online services from a service provider (102). While the examples described below are described in relation to entities with IT environments, entities may seek any appropriate online service through the service provider (102) whether the sought after service is IT related or not.

The entity (104) sets up a business relationship with the communications broker (100) in response to the entity desiring to receive online services. The communications broker (100) provides a list of options of service providers from which the entity can select a service provider. In some examples, the communications broker (100) lists the service providers by name, and the entity (104) can select the service provider (102) based on the service provider's reputation, on outside research about the service providers conducted by the entity, on guarantees provided by the service provider, on other factors, or combinations thereof. In other examples, the service provider (102) is anonymous to the entity (104). In such examples, the communications broker (100) provides the service provider options based on the service providers' parameters such as availability, completeness of service, timeliness, price, other parameters, or combinations thereof. In some examples, the communications broker (100) already has a relationship established with each of the service providers listed. In other examples, the communications broker (100) establishes a relationship with the selected service provider in response to the entity's selection of that service provider.

In response to selecting the service provider (102), the communications broker (100) creates a billing record for the entity (104). Also, in response to selecting the service provider (102), the communications broker (100) creates a record of a relationship with the service provider (102) for the appropriate entity (104). While this example has been described with reference to specific ways of establishing a relationship between the communications broker (100) and the entity (104), any appropriate mechanisms for establishing a relationship with the communications broker (100) may be used in accordance with the principles described herein.

The entity (104) creates an encryption key that is exchanged with the service provider (102) through the communication broker (100). The exchange can occur such that the entity (104) does not know with whom it is exchanging the encryption key. Further, the service provider (102) does not know from whom it received the encryption key. In some examples, such an exchange can be executed by following an anonymous key exchange protocol, such as the Diffie-Hellman key exchange protocol, which is used to exchange secure keys anonymously over unsecure channels. Such a key exchange is facilitated and secured by the communications broker, which is a trusted agent.

Anonymous key exchange protocols can be vulnerable to man-in-the-middle attacks. Such risks to attacks may be minimized or eliminated by giving up a certain level of anonymity in exchange for higher security. For example, a semi-anonymous key exchange protocol that uses a public key infrastructure (PKI) can be implemented.

After executing the encryption key protocol, the service provider (102) and the entity (104) are in possession of a mutual secret encryption key, which is unknown to the communications broker (100). Although the communications broker facilitates all communication between the entity (104) and the service provider (102) and hence sees all messages, the communications broker (100) does not have the encryption key. Thus, all future messages between the entity (104) and the service provider (104) are encrypted with the secret encryption key that is not readable by the communications broker (100). This ensures that even the non-sensitive information included in all future communications routed through the communications broker (100) are ascertainable to just the entity (104) and the service provider (102) while the communications broker (100) is unaware of the communications' content. As long as the communications broker (100) is trustworthy to not perform a man-in-the-middle attack on any anonymous key exchange protocol being used, the communications broker (100) has knowledge about the entity (104), but does not gain access to any content. If the communications broker (100) is not trustworthy, extensive auditing or a semi-anonymous key exchange protocol can be used. The service provider (102) has access to non-sensitive data, but no knowledge about the data's source.

While this example has been described with reference to specific mechanisms for encrypting communications between the service provider and the entity such that the communications broker is unaware of the communications' content, any appropriate mechanisms for encrypting the communications' content may be used in accordance to the principles described herein. Further, while this example has been described with reference to specific ways of exchanging an encryption key between an entity and a service provider, any appropriate mechanisms and/or protocols for exchanging encryption keys may be used.

Further, the entity anonymizes sensitive data in future communications so that the service provider cannot read the sensitive data. Sensitive data may include identifiers or other types of information that may allow the service provider or another party to determine the entity's identity. For example, hostnames, entity names, internet protocol (IP) addresses, medium access control (MAC) addresses, affiliate names, other identifiers, or combinations thereof may be caused to be kept hidden from the service provider. In some examples, the sensitive data is replaced with randomized universally unique identifications (UUIDs). A tracking engine tracks which of the UUIDs represents which sensitive data, so that the entity has full access to incoming and outgoing communications with the service provider. In some examples, a map that tracks the UUIDs and corresponding sensitive information is encrypted and stored with the service provider. However, in such examples, the service provider (102) does not have the appropriate encryption key to determine the map's encryption and as a result, just the entity (104) has access to the mapped items.

While this example has been described with reference to specific types of sensitive information, any appropriate information in any type of message may be classified as sensitive according to the principles described herein. Further, while this example has been described with reference to specific mechanisms for anonymizing the sensitive information, any appropriate mechanisms for anonymizing the sensitive information may be used in accordance to the principles described herein.

In the future messages sent to the service provider (102) from the entity (104), the non-sensitive data contains information about the entity's configurable items, about the entity's IT topology, and other information that the service provider (102) can use to perform services for the entity (104). Such information may be less sensitive or not sensitive to the entity, and the service provider (102) can use the encryption key received from the entity (104) to decrypt such less sensitive or non-sensitive information. As a result, the service provider (102) can perform the services for the entity (104) with just the less sensitive or non-sensitive information and without knowing the sensitive information.

Acknowledgements of receipt, results of performed services, or other messages from the service provider (102) are sent back through the communications broker (100) to the entity (104) without the service provider (102) being aware of whom it is sending such messages. Such communications from the service provider (102) are also encrypted based on the encryption key exchanged between the entity (104) and the service provider (102). These communications are encrypted at the service provider (102) with the encryption key and decrypted at the entity with the encryption key.

Figure 2:
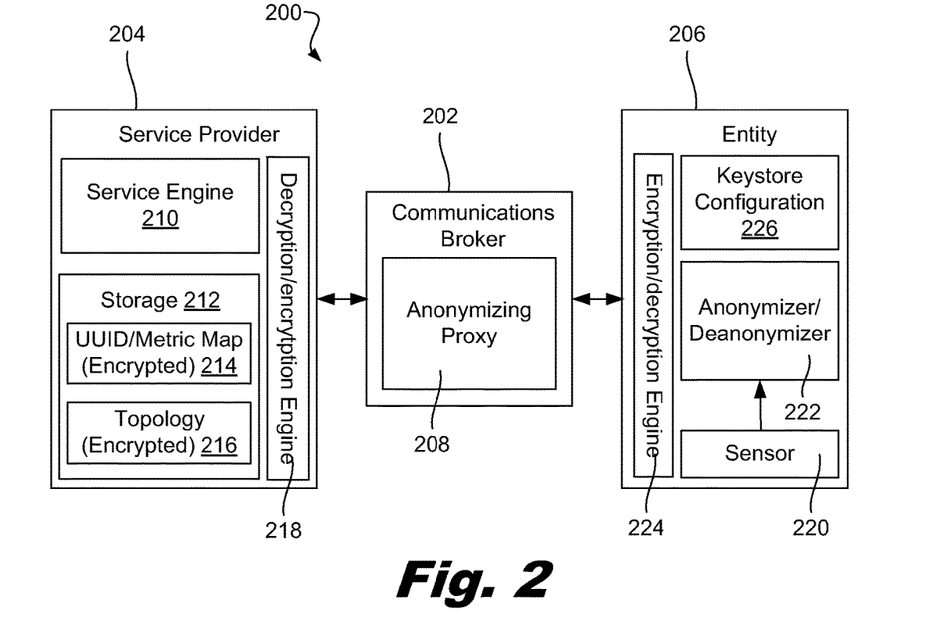
FIG. 2 is a diagram of an example of a sending system according to the principles described herein.

FIG. 2 is a diagram of an example of a sending system (200) according to the principles described herein. In this example, the sending system (200) includes a communications broker (202) that is in communication with a service provider (204) and an entity (206). The communications broker (202) includes an anonymizing proxy (208).

The service provider (204) has a service engine (210) that performs requested services from the entity (206). Further, the service provider (204) has a storage medium (212) that can store the UUID/Metrics Map (214) and the entity's topology (216). The service provider (204) also includes a decryption/encryption engine (218) that can decrypt messages with the encryption key that the service provider (204) received from the entity (206). Further, the service provider (204) can encrypt messages, such as reports, alerts, other messages, or combinations thereof, that are sent to the entity (206) through the communications broker (202), which are decrypted at the entity.

The service provider (204) can generate results from the anonymized data sent from the entity (206). These results can be sent back to the entity (204) in an encrypted form. In some examples, the results are first decrypted by the entity, and then de-anonymized. For examples, the encryption/decryption engine (224) decrypts the entire message, which includes decrypting the identifiers that represent the sensitive data. After the sensitive data is decrypted, the anonymizer/deanonymizer engine (222) in the entity (206) de-anonymizes the results by replacing the identifiers with the sensitive information. The sensitive information and their respective identifiers are stored in a map that tracks and updates the changes to the identifiers and the sensitive information. Thus, the entity (206) constructs the messages from the service provider (204) by decrypting and de-anonymizing the incoming messages.

The entity (206) has a sensor (220) that can be used to measure aspects and performance of the entity's IT environment. Such measurements can be used by the service provider (204) to perform services for the entity (206). Such services may include determining the health of the entity's IT environment, resolving IT issues in the entity's IT environment, identifying anomalous behaviors in the entity's IT environment, processing data from the entity's IT environment, other services, or combinations thereof.

The sensors may send the measurements or collected metrics to an anonymizer/deanonymizer engine (222) that can anonymize sensitive information included in the measurements and its corresponding message. As described above, the sensitive information can be anonymized by replacing the sensitive data with arbitrary identifiers such that just the entity knows the entire message. While the anonymizer/deanonymizer engine (222) anonymizes the sensitive data, it does not anonymize the less sensitive or non-sensitive data that the service provider will use to perform the requested services. The entity (206) also has an encryption/decryption engine (224) that encrypts the measurements, the less sensitive or non-sensitive information, the arbitrary identifiers, other message components, or combinations thereof. Further, the encryption/decryption engine (224) can decrypt the messages from the service provider (204).

The entity (206) also has a keystore configuration (226) where the encryption key exchanged with the service provider can be generated and/or stored. Further, the keystore configuration (226) can also generate and/or store an anonymization key that stores the code to be used when deciphering what the arbitrary identifiers represent. In some examples, the keystore configuration (226) can be customized by the entity based on the entity's input.

The topology of the entity's IT environment can be mapped and encrypted with the encryption engine (224). When encrypted, the topology can be sent to the service provider (204) and stored in the service provider's storage medium (212). Also, the map of the arbitrary identifiers and the sensitive information can be encrypted with a different encryption key not possessed by the service provider (204), so that such a map can also be stored with the service provider (204).

The anonymizer/deanonymizer engine (222) and the encryption engine (224) collectively contain the knowledge to understand messages sent from the service provider (204) to the entity (206) through the communications broker (202). The encryption engine (224) decrypts the less sensitive data, the non-sensitive data, and/or the arbitrary identifiers representing the sensitive data in the messages from the service provider (206). The anonymizer/deanonymizer engine (222) replaces the arbitrary identifiers with their corresponding sensitive information. The service provider (204) is unaware of what the arbitrary identifiers represent and thus the sensitive information is hidden from the service provider (206). Further, the communications broker (202) has neither the encryption key nor the meaning of the arbitrary identifiers, so the communications broker (202) also fails to understand the entire message. Just the entity (206) has all of the knowledge to allow the entity (206) to understand the out-going messages and the incoming messages.

While the examples above have been described with reference to specific hardware for event submission, any appropriate hardware may be used to operate other tasks according to the principles described herein. For example, other tasks may include workflows for topology changes, rendering of reports (including graphical reports) based on information provided by the service provider, monitoring the entity's infrastructure, processing alerts, other tasks, or combinations thereof. In some examples, reports and alerts are finalized locally at the entity because just the entity has the knowledge to completely understand such reports and/or alerts by adding clear text meaningful to the entity to replace the arbitrary identifiers representing sensitive information. In some cases, information, such as templates, can be stored with the service provider in an encrypted state in case of an appliance failure, which could render the appliance stateless.

Figure 3:
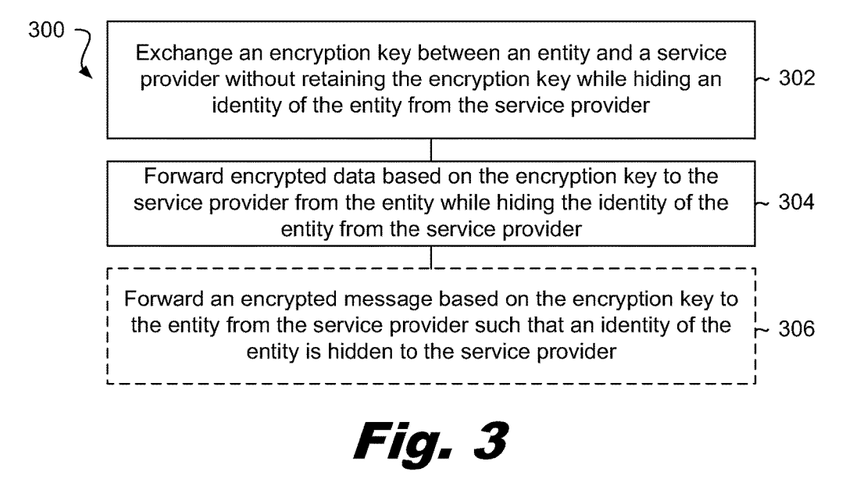
FIG. 3 is a diagram of an example of a method for sending encrypted data to a service provider according to the principles described herein.

FIG. 3 is a diagram of an example of a method (300) for sending encrypted data to a service provider according to the principles described herein. The method (300) includes exchanging (302) an encryption key between an entity and a service provider without retaining the encryption key and without revealing an identity of the entity to the service provider and forwarding (304) encrypted data based on the encryption key to the service provider from the entity without revealing the identity of the entity. In the example of FIG. 3, the method (300) also includes forwarding (306) an encrypted message based on the encryption key to the entity from the service provider such that an identity of the entity is hidden to the service provider.

The encrypted data contains sensitive information that is replaced with randomized unique identification such that the sensitive information is hidden from the service provider. The sensitive information may includes entity names, hostnames, internet protocol (IP) addresses, media access control (MAC) addresses, entity identifiers, other types of information, or combinations thereof. Such sensitive information in the encrypted data is hidden to the service provider while other portions of the encrypted data are discernible to the service provider based on the encryption key that was exchanged with the service provider and the entity.

Likewise, messages from the service provider to the entity also include encrypted data and the anonymized data. The entity has encryption keys to decipher the encryption as well as the ability to determine the meaning of the arbitrary identifiers that replaced the sensitive information. Thus, the service provider does not fully understand the messages that it sends to the entity. Further, the communications broker does not understand the contents of the messages that are exchanged between the service provider and the entity because it does not have the ability to determine the meaning of the arbitrary identifiers representing the sensitive information, nor does the communications broker have an encryption key to decipher the message's encryption.

Figure 4:
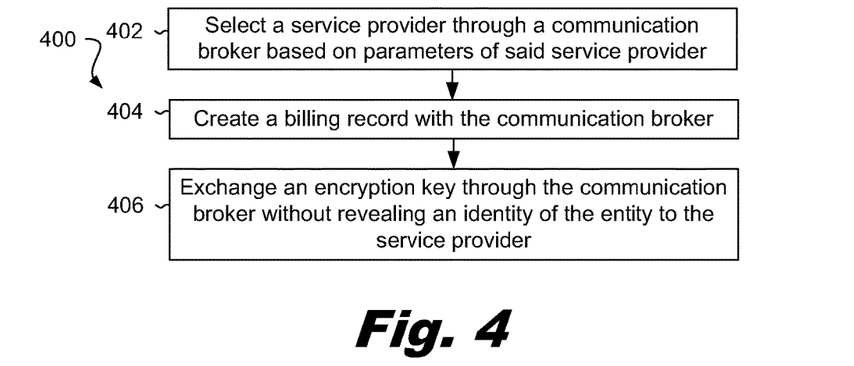
FIG. 4 is a diagram of an example of a method for exchanging an encryption key according to the principles described herein.

FIG. 4 is a diagram of an example of a method (400) for exchanging an encryption key according to the principles described herein. In this example, the method (400) includes selecting (402) a service provider through a communications broker based on parameters of the service provider, creating (404) a billing record with the communication broker, and exchanging (406) an encryption key through the communications broker without revealing an identity of the entity to the service provider.

While this example has been described with reference to specific mechanisms for creating a relationship with the communications broker and the service provider, any appropriate mechanism for establishing a relationship with either the communications broker or the service provider may be used in accordance to the principles described herein. For example, the encryption key may be exchanged in response to preparing for sending a message and the encryption key may be customized for just that particular message. As a result, the encryption key can change frequently to provide additional security.

Figure 5:
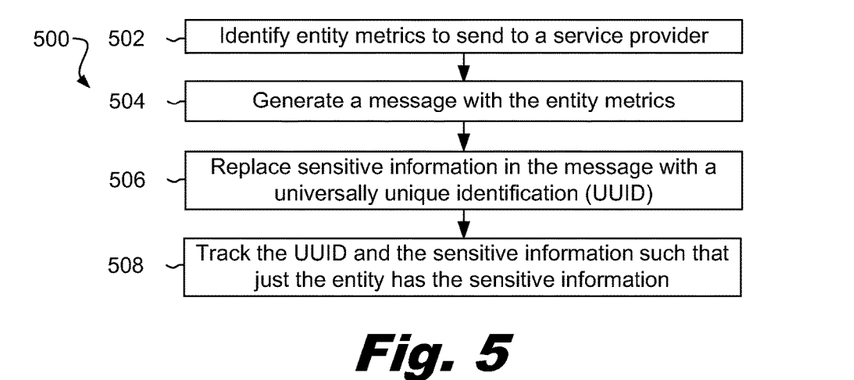
FIG. 5 is a diagram of an example of anonymizing sensitive data in a message according to the principles described herein.

FIG. 5 is a diagram of an example of anonymizing sensitive data in a message according to the principles described herein. In this example, the method (500) includes identifying (502) entity metrics to send to a service provider, generating (504) a message with the entity metrics, replacing (506) sensitive information in the message with a universally unique identification (UUID), and tracking (508) the UUID and the sensitive information such that just the entity has the sensitive information.

A UUID is an identifier standard standardized by the Open Software Foundation (OSF). UUIDs enable distributed systems to uniquely identify information without significant central coordination.

While this example has been described with reference to specifically anonymizing the sensitive data with UUIDs, any appropriate anonymizing mechanisms may be used in accordance with the principles described herein. For example, other types of identifiers can be assigned to replace the sensitive information in such a way that other parties, such as the service provider and the communications broker, cannot decipher the identifiers' represent.

Figure 6:
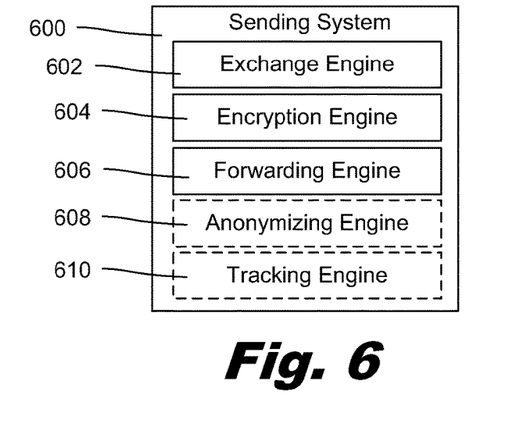
FIG. 6 is a diagram of an example of a sending system according to the principles described herein.

FIG. 6 is a diagram of an example of a sending system (600) according to the principles described herein. The sending system (600) has an exchange engine (602), an encryption engine (604), and a forwarding engine (606). In this example, the sending system (600) also has an anonymizing engine (608) and a tracking engine (610). The engines (602, 604, 606, 608, 610) refer to a combination of hardware and program instructions to perform a designated function. Each of the engines (602, 604, 606, 608, 610) may include a processor and memory. The program instructions are stored in the memory and cause the processor to execute the designated function of the engine.

The exchange engine (602) causes the encryption key to be exchanged between the entity and the service provider in such a manner that the communications broker does not retain the encryption key. The exchange engine (602) may implement any appropriate anonymous or semi-anonymous key exchange protocol to cause the exchange without the communications broker retaining the key.

The encryption engine (604) encrypts the communications between the entity and the service providers in both directions. Such encryptions are based on the encryption key exchanged with the exchanged engine (602). Both the entity and the service provider encrypt their communications before sending the communications through the communications broker. Accordingly, the communications are decrypted by either the service provider or the entity using the same encryption key to decipher what the communications represent.

The forwarding engine (606) forwards the communications received at the communications broker to the appropriate recipient. The communications broker may facilitate communication in both directions (i.e. to the service provider and to the entity).

The anonymizing engine (608) causes sensitive information to be hidden to all parties except the entity. To anonymize the sensitive information, the sensitive information may be replaced with arbitrary and random identifiers, such as UUIDs. The tracking engine (610) tracks the sensitive information and the identifiers put in place by the anonymizing engine (608) and stores a map of the identifiers with their corresponding information. Such a map is unique to its specific deployment and may be stored by the entity. In other examples, the map is encrypted with a second encryption key possessed by just the entity. In such an example, the map may be stored by the service provider because, without the appropriate encryption key customized to the map, the service provider will not have access to the map's content.

Figure 7:
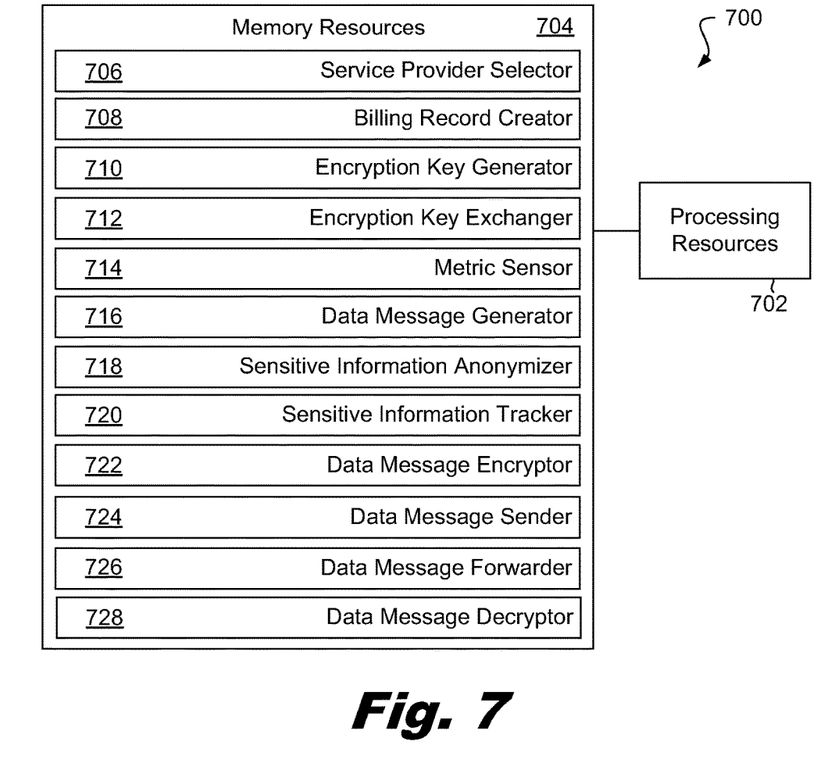
FIG. 7 is a diagram of an example of a sending system according to the principles described herein.

FIG. 7 is a diagram of an example of a sending system according to the principles described herein. In this example, the sending system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the sending system (700). The programmed instructions shown stored in the memory resources (704) include a service provider selector (706), a billing record creator (708), an encryption key generator (710), an encryption key exchanger (712), a metric sensor (714), a data message generator (716), a sensitive information anonymizer (718), a sensitive information tracker (720), a data message encryptor (722), a data message sender (724), a data message forwarder (726), and a data message decryptor (728).

The memory resources (704) include a computer readable storage medium that contains computer readable program code to cause tasks to be executed by the processing resources (702). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, or types of memory, or combinations thereof.

The service provider selector (706) represents programmed instructions that, when executed, cause the processing resources (702) to select a service provider from a list of options presented to the entity. The service provider selector (706) may select the service provider based on input from the entity. The billing record creator (708) represents programmed instructions that, when executed, cause the processing resources (702) to create a billing record in response to the service provider selector (706) selecting a service provider. The billing record creator (708) represents programmed instructions that, when executed, cause the processing resources (702) to create the record between the communications broker and the entity.

The encryption key generator (710) represents programmed instructions that, when executed, cause the processing resources (702) to generate an encryption key for encrypting messages between the service provider and the entity. The encryption key exchanger (712) represents programmed instructions that, when executed, cause the processing resources (702) to exchange the encryption key between the entity and the service provider.

The metric sensor (714) represents programmed instructions that, when executed, cause the processing resources (702) to sense metrics from the entity's IT environment. The data message generator (716) represents programmed instructions that, when executed, cause the processing resources (702) to generate a message based on the metrics collected with the metric sensors (714) intended for the service provider. The sensitive data anonymizer (718) represents programmed instructions that, when executed, cause the processing resources (702) to anonymize sensitive data in the data message such that the sensitive data is hidden from the service provider. The sensitive data anonymizer (718) may anonymize the sensitive data by replacing the sensitive data with arbitrary identifiers whose meaning is unknown to the service provider. A sensitive information tracker (720) represents programmed instructions that, when executed, cause the processing resources (702) to track the sensitive information with their corresponding arbitrary identifiers.

Further, the data message encryptor (722) represents programmed instructions that, when executed, cause the processing resources (702) to encrypt the data message generated with the data message generator (716) based on the encryption key generated with the encryption key generator (710). The data message sender (724) represents programmed instructions that, when executed, cause the processing resources (702) to send the message to the communications broker who has an anonymization proxy that prevents other parties from determining with whom the communications broker is communication. The data message forwarder (726) represents programmed instructions that, when executed, cause the processing resources (702) to forward the message received by the communications broker to the service provider in such a way that the service provider cannot ascertain the source of the data message. The data message decryptor (728) represents programmed instructions that, when executed, cause the processing resources (702) to decrypt the data message at the service provider so that the service provider can perform a service for the anonymous entity. The less sensitive or non-sensitive portions of the data message are decrypted by the data message decryptor (728) while the sensitive information is indiscernible to the service provider because the service provider does not understand what the arbitrary identifiers represent.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries and may be accessed from a remote location over a network connection while the programmed instructions are located locally. Thus, the sending system (700) may be implemented on an entity device, on a server, on a collection of servers, or combinations thereof.

The sending system (700) of FIG. 7 may be part of a general purpose computer. However, in alternative examples, the sending system (700) is part of an application specific integrated circuit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer program product for sending encrypted data to a service provider, comprising:
a non-transitory computer readable storage medium, said non-transitory computer readable storage medium comprising computer readable program code embodied therewith, said computer readable program code comprising program instructions that, when executed, causes a processor to:
exchange an encryption key between an entity and a service provider without retaining said encryption key and while hiding an identity of said entity from said service provider; and
forward encrypted data based on said encryption key to said service provider from said entity while hiding said identity of said entity from said service provider.

2. The computer program product of claim 1, further comprising computer readable program code comprising program instructions that, when executed, causes said processor to forward an encrypted message based on said encryption key to said entity from said service provider.

3. The computer program product of claim 1, wherein said encrypted data contains sensitive information that is replaced with a randomized unique identification such that said sensitive information is hidden from said service provider.

4. The computer program product of claim 1, wherein said sensitive information includes entity names, hostnames, internet protocol (IP) addresses, media access control (MAC) address, entity identifiers, or combinations thereof.

5. The computer program product of claim 1, further comprising computer readable program code comprising program instructions that, when executed, causes said processor to provide said entity an option to establish a relationship with a service provider.

6. The computer program product of claim 1, further comprising computer readable program code comprising program instructions that, when executed, causes said processor to create a relationship with entity with an establishment of a billing record.

7. A system for sending encrypted data to a service provider, comprising:
   program instructions stored in memory that cause a processor to operate multiple engines;
   an exchange engine to exchange an encryption key between an entity and a service provider without retaining said encryption key and while hiding an identity of said entity from said service provider;
   an encryption engine to encrypt entity data based on said encryption key; and
   forwarding engine to forward encrypted data based on said encryption key to said service provider from said entity while hiding said identity of said entity from said service provider.

8. The system of claim 7, further comprising an anonymizing engine to cause said encrypted data to hide sensitive information such that an identity of said entity is hidden from said service provider.

9. The system of claim 8, wherein said anonymizing engine to replace sensitive information with a randomized unique identification such that said sensitive information is hidden from said service provider.

10. The system of claim 8, wherein said sensitive information includes entity names, hostnames, internet protocol (IP) addresses, media access control (MAC) address, entity identifiers, or combinations thereof.

11. The system of claim 8, further comprising a tracking engine to track said randomized unique identification and its corresponding sensitive information.

12. The system of claim 7, wherein said exchanging engine to implement an anonymous key exchange protocol or a semi-anonymous key exchange protocol to exchange said encryption key.

13. A method for sending encrypted data to a service provider, comprising:
   exchanging an encryption key between an entity and a service provider without retaining said encryption key and while hiding an identity of said entity from said service provider;
   forwarding encrypted data based on said encryption key to said service provider from said entity while hiding said identity of said entity from said service provider; and
   forwarding an encrypted message based on said encryption key to said entity from said service provider such that an identity of said entity is hidden from said service provider.

14. The method of claim 13, wherein said encrypted message includes results of services from said service provider.

15. The method of claim 13, wherein sensitive information in said encrypted data is hidden to said service provider while other portions of said encrypted data are discernible to said service provider based on said encryption key.

16. The computer program product of claim 1, comprising instructions that, when executed, cause the processor to: forward the encrypted data to an anonymizing proxy.

17. The system of claim 7, wherein the forwarding engine to forward the encrypted data to an anonymizing proxy.

18. The system of claim 17, wherein the encrypted data is forwarded to the anonymizing proxy before reaching said service provider.

19. The method of claim 13, wherein forwarding the encrypted message to said service provider comprises forwarding the encrypted message to an anonymizing proxy.

20. The method of claim 19, wherein the encrypted message is forwarded to the anonymizing proxy before reaching said service provider.

* * * * *